(12) United States Patent
Woodall

(10) Patent No.: US 6,618,713 B1
(45) Date of Patent: Sep. 9, 2003

(54) NEURAL DIRECTORS

(75) Inventor: Roger L. Woodall, Jewett City, CT (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/436,957

(22) Filed: Nov. 4, 1999

(51) Int. Cl.$^7$ ............................................... G06F 15/18
(52) U.S. Cl. ........................................................... 706/15
(58) Field of Search ..................................... 706/15–44

(56) References Cited

U.S. PATENT DOCUMENTS

| | | | | |
|---|---|---|---|---|
| 5,712,959 A | * | 1/1998 | Streit | 706/20 |
| 5,724,487 A | * | 3/1998 | Streit | 706/25 |
| 5,790,758 A | * | 8/1998 | Streit | 706/33 |

OTHER PUBLICATIONS

An adaptive training algorithm for back–propagation neural networks, Hsin, H.–C.; Li, C.–C.; Sun, M.; Sclabassi, R.J.; Systems, Man and Cybernetics, 1992., IEEE International Conference on , 18–21, Oct. 1992, pp. 1049–1052 vol. 2.*

An adaptive training algorithm for back–propagation neural networks Hsin–Chin Hsi; Ching–Chung Li; Mingui Sun; Sclabassi, R.J.; Systems, Man and Cybernetics, IEEE Transactions on , vol.: 25 Issue: 3 , Mar. 1995 pp. 512–514.*
ANSA: a new neural net based scheduling algorithm for high level synthesis Kemal Unaltuna, M.; Pitchumani, V.; Circuits and Systems, 1995. ISCAS '95., 1995 IEEE International Symposium on , vol. 1, (1995) pp. 385–388.*

* cited by examiner

*Primary Examiner*—John Follansbee
*Assistant Examiner*—Michael B. Holmes
(74) *Attorney, Agent, or Firm*—James M. Kasischke; Michael F. Oglo; Jean-Paul A. Nasser

(57) ABSTRACT

A neural director is provided which is a neural network constructed with weights that are determined a priori. The neural director receives an input vector X comprising "I" input components "$X_i$" and generates in response an output vector Y comprising "J" output components. The neural director has an input processing node layer which receives the input vector X and an output processing node layer which generates the output vector Y. The connections between the input and output processing node layers are a unique weighting set w(i,j) that contains an internal representation of a uniform spatial distribution of "J" unit vectors throughout a unit sphere of "I" dimensions. Thus the cosine value between any two adjacent unit vectors is a constant everywhere in the unit sphere.

17 Claims, 3 Drawing Sheets

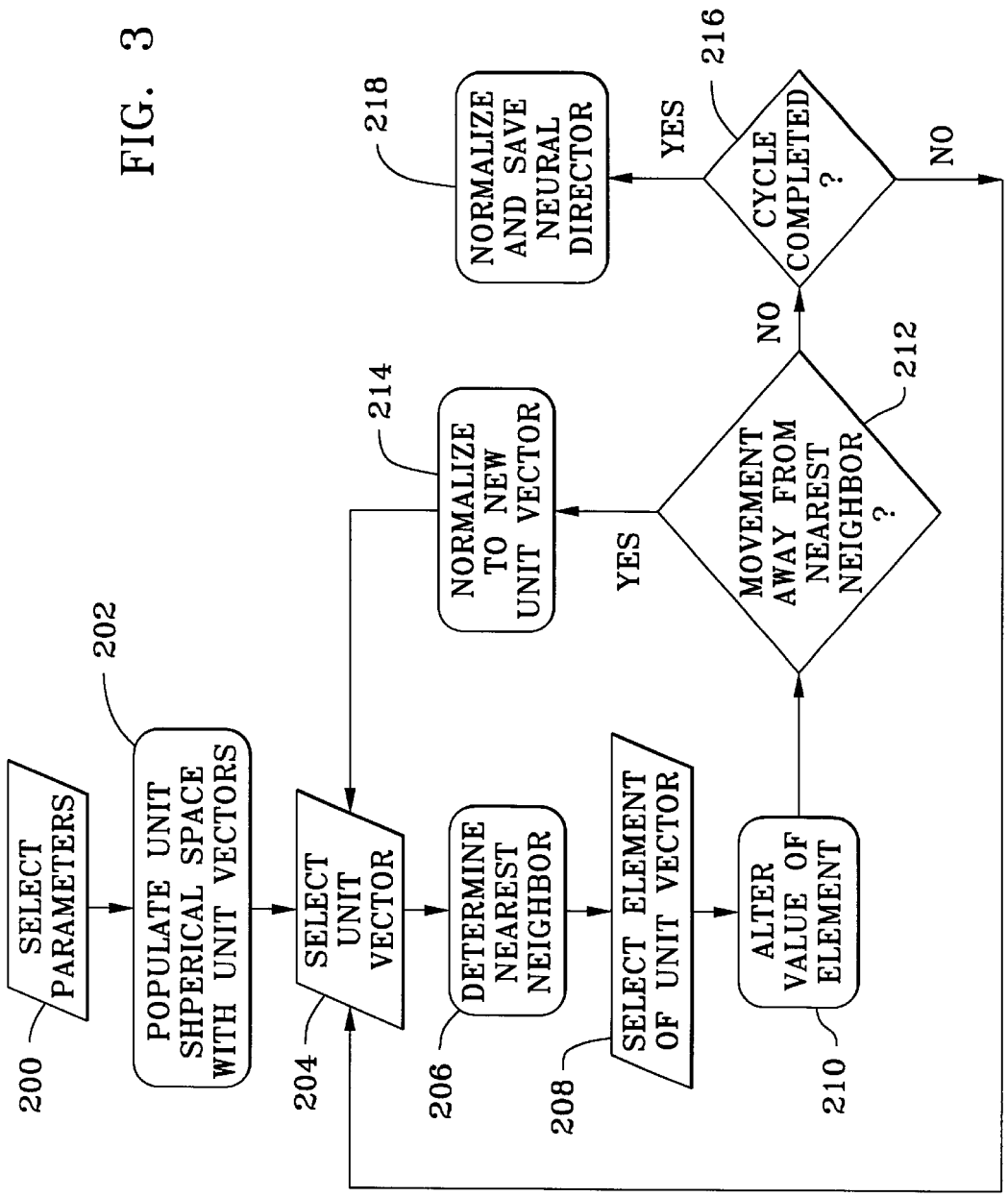

10# NEURAL DIRECTORS

CROSS-REFERENCE TO RELATED APPLICATION

This patent application is co-pending with related patent application entitled Neural Sensors (Navy Case No. 74989) by the same inventor as this patent application U.S. application Ser. No. 09/436,956, filed Nov. 4, 1999.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

(1) Field of the Invention

The present invention relates generally to the field of electronic neural networks, and more particularly to a new architecture for neural networks having a plurality of hidden layers, or multi-layer neural networks, and further to new methodologies for providing supervised and unsupervised training of neural networks constructed according to the new architecture.

(2) Description of the Prior Art

Electronic neural networks have been developed to rapidly identify patterns in certain types of input data, or to accurately classify the input patterns into one of a plurality of predetermined classifications. For example, neural networks have been developed which can recognize and identify patterns, such as the identification of hand-written alphanumeric characters, in response to input data constituting the pattern of on/off picture elements, or "pixels," representing the images of the characters to be identified. In such a neural network, the pixel pattern is represented by, for example, electrical signals coupled to a plurality of input terminals, which, in turn, are connected to a number of processing nodes, or neurons, each of which is associated with one of the alphanumeric characters which the neural network can identify. The input signals from the input terminals are coupled to the processing nodes through certain weighting functions, and each processing node generates an output signal which represents a value that is a non-linear function of the pattern of weighted input signals applied thereto. Based on the values of the weighted pattern of input signals from the input terminals, if the input signals represent a character which can be identified by the neural network, one of the processing nodes which is associated with that character will generate a positive output signal, and the others will not. On the other hand, if the input signals do not represent a character which can be identified by the neural network, none of the processing nodes will generate a positive output signal. Neural networks have been developed which can perform similar pattern recognition in a number of diverse areas.

The particular patterns which the neural network can identify depend on the weighting functions and the particular connections of the input terminals to the processing nodes, or elements. As an example, the weighting functions in the above-described character recognition neural network essentially will represent the pixel patterns which define each particular character. Typically, each processing node will perform a summation operation in connection with the weight values, also referred to as connection values or weighting values, representing the weighted input signals provided thereto, to generate a sum that represents the likelihood that the character to be identified is the character associated with that processing node. The processing node then applies the non-linear function to that sum to generate a positive output signal if the sum is, for example, above a predetermined threshold value. The nonlinear functions which the processing nodes may use in connection with the sum of weighted input signals are generally conventional functions, such as step functions, threshold functions, or sigmoids. In all cases the output signal from the processing node will approach the same positive output signal asymptotically.

Before a neural network can be useful, the weighting functions for each of the respective input signals must be established. In some cases, the weighting functions can be established a priori. Normally, however, a neural network goes through a training phase, in which input signals representing a number of training patterns for the types of items to be classified (e.g., the pixel patterns of the various hand-written characters in the character-recognition example) are applied to the input terminals, and the output signals from the processing nodes are tested. Based on the pattern of output signals from the processing nodes for each training example, the weighting functions are adjusted over a number of trials. Once trained, a neural network can generally accurately recognize patterns during an operational phase. The degree of success is based in part on the number of training patterns applied to the neural network during the training stage and the degree of dissimilarity between patterns to be identified. Such a neural network can also typically identify patterns which are similar, but not necessarily identical, to the training patterns.

One of the problems with conventional neural network architectures as described above is that the training methodology, generally known as the "back-propagation" method, is often extremely slow in a number of important applications. Also, under the back-propagation method, the neural network may provide erroneous results which may require restarting the training. In addition, even after a neural network has been through a training phase, confidence that the best training has been accomplished may sometimes be poor. If a new classification is to be added to a trained neural network, the complete neural network must be retrained. Further, the weighting functions generated during the training phase often cannot be interpreted in ways that readily provide understanding of what they particularly represent.

SUMMARY OF THE INVENTION

Accordingly, it is an object of the present invention to provide a new and improved neural network in which the weighting functions are determined a priori.

Other objects and advantages of the present invention will become more obvious hereinafter in the specification and drawings.

In accordance with the present invention, a new neural network, referred to hereinafter as a neural director, is part of a new neural network technology that is constructed rather then trained. Since the words "neural networks" often connote a totally trainable neural network, a constructed neural network is a connectionist neural network device that is assembled using common neural network components to perform a specific process. The constructed neural network assembly is analogous to the construction of an electronic assembly using resistors, transistors, integrated circuits and other simple electronic parts. A constructed neural network is fabricated using common neural network components such as processing elements (neurons), output functions, gain elements, neural network connections of certain types or of specific values and other artificial neural network parts. As in electronics, the design goal and the laws of nature such as mathematics, physics, chemistry, mechanics, and "rules of thumb" are used to govern the assembly and architecture of a constructed neural network. A constructed neural network, which is assembled for a specific process without the use of training, can be considered equivalent to a trained neural network having accomplished an output error of zero after an infinite training sequence. Although there are some existing connective circuits that meet the design criteria of a constructed neural network, the term "constructed neural network" is used herein to differentiate this new neural technology which does not require training from the common neural network technology requiring training.

Constructed neural networks can be embodied in analog or digital technologies, or in software. Today one can find a blurring between the boundaries of analog and digital technologies. Some of the classic analog processing is now found in the realm of digital signal processing and classic digital processing is found in analog charged couple devices and sample and hold circuits especially in the area of discrete time signals and shift registers.

In brief, a neural director receives an input vector X comprising "I" input components $X_i$ and generates in response thereto, an output vector Y comprising "J" output components $Y_j$, where "I" and "J" are the neural director's input and output dimensions. The neural director has an input processing node layer comprised of "I" processing nodes and an output processing node layer comprised of "J" processing nodes. Each output processing node receives the outputs from the input processing nodes to which a weighting value w(i,j) has been applied and generates one of said output components $Y_j$ representing a linear function in connection therewith. The weighting values w(i,j) contain a unique internal representation of a uniform spatial distribution. A neural director can be constructed to be one of two types, designated type 1 or type 2. The two types differ in what may be termed "spatial linearity". In addition to classic linearity, i.e., the use of non-linear weighting functions in the neural circuit, spatial linearity includes a "linearity in space". In a fully populated single layer neural network which has "I" input processing nodes and "J" output processing nodes, each of the output processing nodes will contain "I" weight values. The "I" weight values of each processing node can be considered a vector of "I" components in an "I" dimensional space. One of the many important characteristics of a constructed neural network is that a classification of an input pattern is greatly defined by a vector's direction in a multidimensional space. Thus, spatial linearity/nonlinearity affects the internal process of a neural director. An angular relationship between input and output vector pairs can be used to define the spatial linearity. A network is linear in space when the angles between all different vector pairs are the same in the output space as they are in the input space regardless of the dimensionalities of the spaces. A network is nonlinear if it is either classically and/or spatially nonlinear. A spatial nonlinearity causes an input vector pair to diverge in direction in the output space and is analogous to a system nonlinearity in chaos theory where two similar initial condition points diverge over time. A neural director type 1 is linear in both its neural circuit, i.e., classically linear, and in its space, i.e., spatially linear. Generally, a neural director type 2 is classically linear but spatially nonlinear, though it will be understood that either classic or spatial nonlinearity will result in a neural director type 2. When compared to a neural director type 1 of the same input and output dimensions, a neural director type 2 nonlinearly shifts an input vector away from the output direction which one would anticipate using the neural director type 1. A neural director type 2 produces a nonlinear gradient between two poles in its multidimensional output space, one pole lying in the center of a sub space that is directed by all positive elements and the other pole being the opposite polarity.

Spatial nonlinearity is a parameter for a constructed neural network connectionist device which affects the recognition differentiation between similar input patterns. Reduced to its most basic concept, a constructed neural network senses features from a specific input pattern to provide a deterministic direction through a connecting circuit as a feature vector. This deterministic direction in a multidimensional space is the information that is used for the recognition and classification of the pattern. The spatial nonlinearities of the type 2 neural director provide a process that allows the discrimination of finer details in the recognition of an input pattern. Spatial nonlinearity is the result of a deterministic change in a vector's direction in its multidimensional space relative to its intended direction in a linear space. The dimensionalities between these spaces may be different or the same. While most conventional neural networks demonstrate a spatial nonlinearity, their spatial nonlinearity is primarily caused by the use of nonlinear neurons.

The neural director type 1 has several advantages in performing different operations depending upon its application in a network. A neural director type 1 has the ability to linearly transform a vector from one set of dimensions to the same or that of another set of dimensions. The type 1 neural director can fuse separate data paths into a single vector as each output element of the vector contains a composition of all input elements of the input data. The type 1 neural director may also distribute input data into different layers of like data and can expand its input data into higher dimensions, where the input data can be sensed at a higher resolution than it can in its lower dimension. Although the dimensions are not totally independent, the dimensional independency can be increased when the type 1 neural director is coupled with a spatially nonlinear device. The neural director type 1 can represent a generalized matched filter which contains all possible combinations of input patterns due to its distributed connection set. The type 1 neural director can linearly expand input data or can use nonlinear output functions, which when applied to a conventional neural network in lieu of the original data will make the conventional network learn faster. Depending on the resolution chosen for the internal representation of the uniform spatial distribution, a neural director type 1 may be called a "near" ideal neural director type 1. A near ideal neural director type 1 remains linear in its neural circuit but it is slightly nonlinear in space because the position of a vector in the neural director's output space will be altered relative to the vector's ideal position in a linear space. Used in a multilayer neural director, the near ideal neural director type 1, without other nonlinearities, increases the recognition resolution of similar input patterns.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein:

FIG. 3 is a flow chart depicting an second embodiment of the steps performed to determine the weighting values w(i,j).

DESCRIPTION OF THE PREFERRED EMBODIMENT

Figure 1:
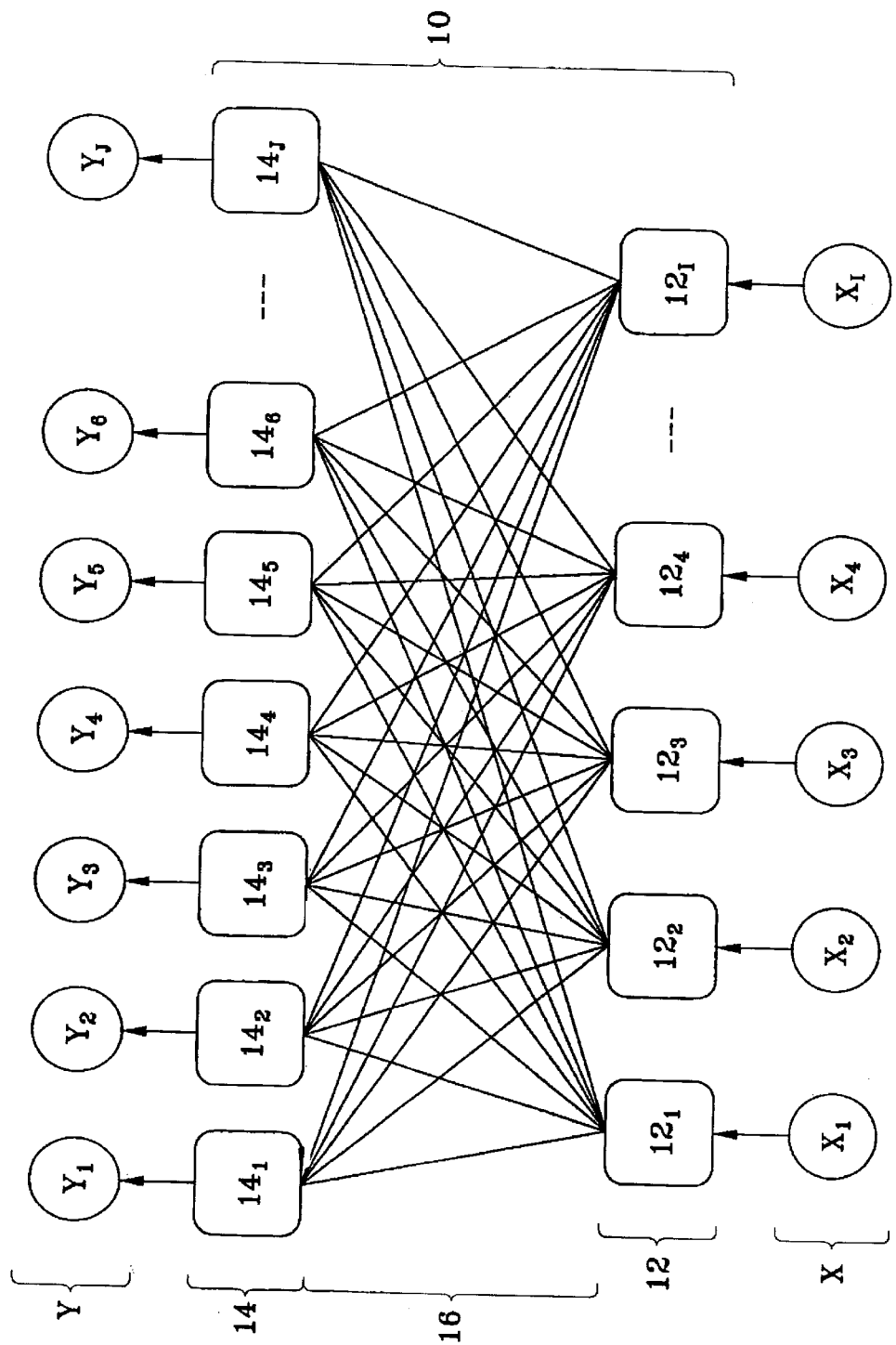
FIG. 1 is a general or neural schematic illustrating a fully populated neural director constructed in accordance with the invention.

Referring now to FIG. 1, there is shown a general neural schematic illustrating a neural director 10 constructed in accordance with the invention. Neural director 10 includes an input processing node layer 12, an output processing node layer 14 and a set of connections, or weighting set w(i,j), shown as 16 in FIG. 1. An input vector X includes a plurality of input signals $X_1$ through $X_I$, comprising components $X_i$ of the input vector X. Input processing node layer 12 has a corresponding plurality of input processing nodes $12_1$ through $12_I$, each input processing node $12_i$ receiving corresponding input signal $X_i$.

Each node $12_i$ of the input processing node layer 12 generates a processed signal which it couples to each one of a plurality of output processing nodes $14_1$ through $14_J$, as indicated by weighting set 16. The number "I" of input processing nodes $12_i$ and the number "J" of output processing nodes $14_j$ are the input and output dimensions of the neural director 10. In general, the value of "J" is equal to or greater than the value of "I". The processed signals generated by each input processing node $12_i$ represent a value reflecting a predetermined linear function of the input signal $X_i$. All of the input processing nodes $12_i$ preferably use the same linear function, but apply different weighting values to the function in accordance with the weighting set w(i,j) 16.

Each output processing node $14_j$ of the output processing node layer 14 also generates an output signal $Y_j$, comprising the output vector elements $Y_1$ through $Y_J$ of output vector Y. Each output processing node $14_j$ effectively receives the weighted values of processed signals from the input processing nodes $12_i$ connected thereto according to the weighting set w(i,j) 16, generates a sum of the weighted values and generates in response to the sum an output signal $Y_j$ representing a value reflecting a function of the generated sum. All of the output processing nodes $14_j$ use the same function, but the function used by the output processing nodes $14_j$ may differ from the linear function used by the input processing nodes $12_i$. It is to be noted that function used by the output processing nodes $14_j$ may be nonlinear functions. The operations or steps performed to determine the weighting set w(i,j) 16 will be described below in connection with the flowchart in FIG. 2.

As described above, the neural director 10 is constructed, rather than trained as in a conventional neural network. Accordingly, the weighting set w(i,j) 16 is determined a priori, and not in relation to any training data. As noted above, the input signals received into processing node layer 12 may be viewed as a vector X, having components $X_i$, which is a vector of "I" dimensions. Similarly, the outputs provided by the output processing node layer 14 may be viewed as a vector Y having components $Y_j$, which is a vector of "J" dimensions where "J" is equal to or greater than "I". Each of the output processing nodes $14_j$ contains an "I" dimensional vector of weighted values, thus all the weighted values in the neural director 10 can be represented by a "J" array of "I" dimensional vectors, or the weighting set w(i,j) 16.

An "I" dimensional vector of weight values for a typical input processing node $12_i$ is in a normalized form of a unit vector. Each of the represented unit vectors has a specific relationship relative to its nearest neighboring unit vectors: the cosine of the angle between any two adjacent or nearest neighbor vectors is a constant. These nearest neighbor vector requirements will produce a neural director 10 with a weighting set w(i,j) 16 that has the same values as a set of "J" unit vectors of "I" dimensions which are uniformly distributed throughout an "I" dimensional unit sphere. Each input processing node $12_i$ is associated with a common dimension "i" of the weighting set w(i,j) 16.

The neural director 10 weight values of the weighting set w(i,j) 16 contain a unique internal representation for a relative spatial distribution. The weighting set w(i,j) 16 for neural director 10 with an "I" input dimension and a "J" output dimension is given as:

$$w(i,j)=ka(i,j)|S^*, \text{ where} \qquad (1)$$

a(i,j) is a "J" dimensional array of unit vectors of "I" dimensions;

k is a constant which represents a non unit vector magnitude of a weighting set w(i,j) 16 as compared to the vector set a(i,j); and

|S* is defined as a symbol to represent the uniform distribution of the "J" unit vectors throughout a unit sphere of "I" dimensions.

Thus the cosine value between any two adjacent unit vectors is a constant everywhere in the unit sphere. The cosine test is a metric to measure the uniformity of the distribution. For a typical k value of one, w(i,j)=a(i,j). Thus the weight values to an output processing node "j" are the same numerical values as the "i" elements of the appropriate "j" unit vector.

A neural director that contains equal input and output dimensions has an additional requirement in its construction, the additional requirement being a coordinate axis shift between the input space and the output space. The coordinate axis shift is defined by the following description. The position of the first output coordinate axis is at a 45 degree angle relative to any and each pair of input coordinate axes. The remaining output coordinate axes are all orthogonal to said first output coordinate axis.

The operations or steps performed to determine the weighting set w(i,j) 16 used by the input processing nodes $12_i$ can be an algorithm or a process as described in connection with an exemplar flow chart in FIG. 2. First a general outline of the operations will be described followed by a detailed description in relation to FIG. 2. A general outline for the design of an "I" input dimension and a "J" output dimension neural director 10 is to fully pack a unit sphere with unit vectors of "I" dimensions. A packing cosine is chosen to produce an optimum high packing density with a minimum size of the array of vectors packed. When the sphere is judged "fully packed" the array of vectors is saved to allow an at least one iteration of vector selection. An input of a culling cosine parameter is used to estimate the correct final density of the "J" vectors in the unit sphere. The fully packed sphere of vectors is used to select a set of "J" unit vectors where each vector is chosen from the pack to produce the uniform distribution required by the design of the neural director.

Figure 2:
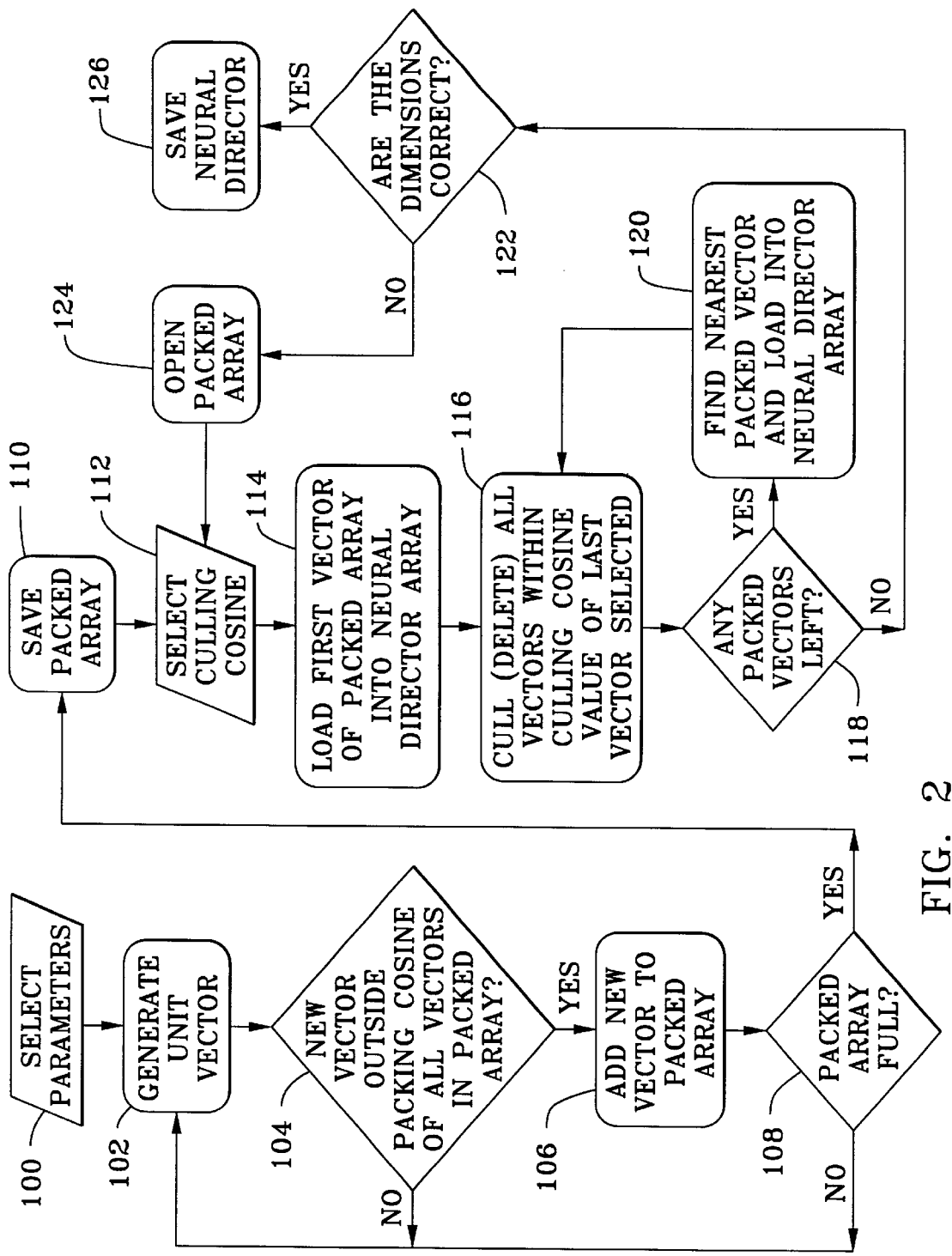
FIG. 2 is a flow chart depicting the steps performed to determine the weighting values w(i,j) used by the output processing nodes of the neural director depicted in FIG. 1.

More specifically, and with reference to FIG. 2, to generate an array of unit vectors a(i,j) for the weighting values w(i,j) of a neural director 10 depicted in FIG. 1, initially several parameters are selected at step 100: a packing cosine; an input dimension "I"; and an output dimension "J". The packing cosine is selected to develop a high vector count throughout a unit sphere with a density that is tighter in vector packing than the maximum error of placement for the final set of vectors. The packing cosine also determines an overall high packing density with a maximum number of unit vectors to be dispersed in the "I" dimensional unit sphere. Step 102 generates a vector by a random selection of positive and negative vector element values and the vector is normalized into a unit vector of "I" dimensions. Step 104 compares the unit vector in closeness to all existing unit vectors in the packed array. If the generated unit vector is closer then the packing cosine value to any existing vector in the array, the vector is rejected and the process returns to step 102 to generate a new unit vector. If the generated unit vector is not near any existing vectors, it is accepted into the packed array at step 106. Step 108 tests the packed array in the "I" dimensional unit sphere to determine if it is full. The test is the inspection of the number of rejected unit vectors to that of the accepted unit vectors. A very high ratio of rejected vectors to accepted vectors indicates that there is a high probability that the "I" dimensional unit sphere is full and the packed array is saved at step 110. If, however, the ratio is low, the process returns to step 102 to generated a new unit vector.

Once the densely packed array of unit vectors in an "I" dimensional sphere is available from step 110, a culling cosine value is selected at step 112. Step 114 selects a unit vector in the packed array as the first vector to be loaded into the neural director array. For neural directors having equal input and output dimensions, step 114 selects the unit vector wherein the absolute value of each element is the most equal to the average absolute value of all elements in the vector. Step 116 culls or deletes all those vectors of the packed array which are within the culling cosine range from the selected unit vector except for the selected unit vector itself, thus isolating the selected unit vector within the culling cosine range. Step 118 searches the packed array to determine if there are vectors not selected nor culled. If there are vectors remaining, step 120 finds the closest vector to both the last vector isolated and the next to last vector isolated and returns to step 116 to cull around the found vector. If only the first vector has been isolated, i.e., on the first iteration through step 120, then step 120 finds the vector closest to the first isolated vector. If step 118 determines there are no vectors remaining, step 118 proceeds to step 122 which tests the array of isolated vectors, i.e., the neural director array, for the correct output dimension "J". The number of isolated unit vectors must equal "J". If the dimension is not correct, step 122 proceeds to step 124 to open the packed array again. Once the packed array is again made available, the process returns to step 112 to select an iterative value of a new culling cosine and repeat steps 114 through 122 until the correct dimension is obtained. If the dimension is correct then step 122 proceeds to step 126 to save the array of unit vectors a(i,j).

Upon the completion of steps 100 through 126, the saved array of unit vectors a(i,j) becomes the weighting set w(i,j) 16 through the equation given. Also, due to the symmetry of the uniform vector distribution in both input and output dimensions, the same vector array of unit vectors a(i,j) can be shown as a(j,i) containing the same values. Thus, the unit vectors a(i,j) can produce an inverse transform neural director with a weighting set w(j,i). In this case, the input dimension of the inverse neural director is the numerical value "J" and the output dimension is the numerical value "I". It is also to be noted that the packed array of specific input dimensions developed in steps 100 through 110 can be used to produce different neural directors all with the same input dimension but with different output dimensions.

The neural director 10 has been described as comprising a "J" dimensional construct within an "I" dimensional space, including regions of the "I" dimensional space having both positive and negative component values. However, it will be appreciated that neural director 10 may be constructed with unit vectors having a propensity toward selected regions of the "I" dimensional space. For example, once step 122 determines that the dimensions are correct, one of the unit vectors may be chosen as a reference vector, denoted as $a_{ref}$. The weight values, w(i,j), for each element (i=1 to I) of a unit vector "j" are then taken as $$w(i,j)=w(i,j)+\alpha \cos(^{dist}/_2) \times w(i,a_{ref}), \text{ where} \quad (2)$$

α is a proportionality constant;
cos(dist/2) is the cosine of half the distance between the reference vector $a_{ref}$ and the vector "j"; and
$w(i,a_{ref})$ is the weight value of the "i"th element of the reference vector. The resulting vectors are then normalized to provide new unit vectors. It can be seen that the resulting distribution would tend to cluster about the reference vector, with the clustering having a gradient so as to become more pronounced the closer one gets to the reference vector. This construction method produces a neural director type 2 which contains a spatial uni-polar, or single region, non-linearity. If the distance term were to be α cos(dist), the resulting distribution would tend to cluster about the reference vector and its corresponding opposite polarity unit vector. Again, the clustering becoming more pronounced the closer one gets to the reference vector or to its opposite polarity unit vector. This construction method produces a neural director type 2 which contains a spatial bi-polar, or two region, non-linearity. Other functions of the distance between the reference vector $a_{ref}$ and the vector "j" could be used to obtain distributions having differing polarity, or uni-polar and bi-polar distributions with varying clustering gradients.

The neural director 10 constructed as described above can be used in a number of environments. While the output processing nodes $14_j$ would normally use weighting set w(i,j) 16 as multiplicative factors on the values of input vector X, they may use the weighting values to represent time as relative delay values d(i,j), in which case the neural director 10 would be a temporal neural director. Such a temporal neural director would have temporal sensitivities to the input sequences of input vector X. In either case, the neural director 10 may be used to extract and transform features into a higher-dimensional space, in the manner of visual, aural, olfactory and color sensor architectures of an artificial brain. In addition, the neural director 10 may be used in a memory constructed neural network as a generalized matched filter set to reduce the dimensionality of an input sensor's feature vectors, and, with nonlinear neurons it may be used as a "general function" in a functional-link neural network. Furthermore, the neural director 10 can be used as a generalized Kohonen map without training; in that use, the output processing nodes $14_j$ are a representation of similar input vectors X, with resolution between similar input vectors being directly related to the Euclidean distance across the surface of the "I" dimensional output subspace at which the "J" output processing nodes 14 are placed.

The neural director type 1 has the ability to linearly transform a vector from one dimension to that of another dimension. The neural director when coupled with a constructed neural network that develops data context dependent paths through the neural network generates a spatial nonlinearity. This spatial nonlinearity causes the output vector elements to be less dependent as compared to the elements of an ideal linear vector transformation. The neural director makes another constructed neural network or a common trainable neural network more sensitive to pattern variations of close pattern classification.

Although the present invention has been described relative to a specific embodiment thereof, it is not so limited. FIG. 3 is a flow chart of the steps of a second embodiment for developing the weighting set w(i,j) 16 for neural director 10. The parameters "I" and "J" are first selected at step 200. Step 202 then places "J" random direction unit vectors in a unit spherical space of "I" dimensions. Step 204 randomly selects a unit vector and step 206 measures its Euclidean distance to all other unit vectors and determines its nearest neighbor. Step 208 randomly selects one element of the unit vector and step 210 randomly alters its value. Step 212 determines if the new element value has caused the selected unit vector to move away from its nearest neighbor and not move into a lesser distance towards one or more of its other neighbors. If it has, then step 212 proceeds to step 214 which normalizes the new vector with the new element value to a new unit vector. The process then returns to step 204 to choose another unit vector. If the selected unit vector has not moved away from its nearest neighbor, or has moved into a lesser distance towards one or more of its other neighbors, step 212 proceeds to step 216 which checks whether the position of all vectors are uniform within a predetermined accuracy. If not, step 216 returns to step 204–210 to randomly select a vector and alter an element value once more. When the cycle through steps 204–212 has been sufficiently completed as determined at step 216, all unit vectors will have been placed exactly in a uniform distribution throughout the unit sphere, satisfying the unit vector requirements to produce a neural director weighting set w(i,j), and the neural director can be normalized and saved as shown at step 218. The disadvantage of this embodiment is that the magnitude of the random element change must be prudently selected to keep the dynamics of the behavior relatively stable.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A neural director comprising:
   an input processing node layer having a first plurality "I" of input processing nodes;
   an output processing node layer having a second plurality "J" of output processing nodes; and
   connections from each of the input processing nodes to each of the output processing nodes, each one of the connections constructed with a weighting value corresponding to one element of a set of "J" unit vectors uniformly distributed in a spherical space of "I" dimensions wherein a cosine value between any two adjacent unit vectors of the set of unit vectors is a constant.

2. The neural director of claim 1 wherein the set of unit vectors is biased toward at least one selected region in the spherical space.

3. The neural director of claim 2 wherein the at least one selected region comprises two bi-polar regions 180° apart in the spherical space.

4. The neural director of claim 2 wherein:
   the at least one selected region corresponds to a selected reference unit vector; and
   a component of each of the weighting values corresponds to a function of a distance between the reference unit vector and the unit vector for which the weighting value is being determined.

5. A method for determining weighting values of connections in a neural director having an input processing node layer with a first plurality "I" of input processing nodes and an output processing node layer having a second plurality "J" of output processing nodes, the connections being from each of the input processing nodes to each of the output processing nodes, the method comprising the steps of:
   generating an array of "J" unit vectors uniformly distributed in a spherical space of "I" dimensions wherein a cosine value between any two adjacent unit vectors of the set of unit vectors is a constant; and
   assigning one component value of the array to each connection, such that the weighting value of a connection between the $i^{th}$ input processing node and the $j^{th}$ output processing node corresponds to the $i^{th}$ component value of the $j^{th}$ unit vector.

6. The method of claim 5 wherein the step of generating an array of "J" unit vectors further comprises the steps of:
   generating a densely packed array of unit vectors in the spherical array, the densely packed array containing significantly more than "J" unit vectors; and
   culling unit vectors from the densely packed array to obtain the array of "J" unit vectors.

7. The method of claim 6 wherein the densely packed array generating step further comprises the steps of:
   selecting a packing cosine;
   generating a random unit vector;
   adding the random unit vector to the densely packed array when the random unit vector is outside the packing cosine of all unit vectors in the densely packed array; and
   returning to the random unit vector generating step when the random unit vector is outside the packing cosine of all unit vectors in the densely packed array saving.

8. The method of claim 7 wherein the densely packed array generating step further comprises the steps of:
   determining if the densely packed array is full immediately following the random unit vector adding step;
   returning to the random unit vector generating step if the densely packed array is not full; and
   saving the densely packed array if the densely packed array is full.

9. The method of claim 8 wherein the fullness determining step comprises measuring the ratio of random unit vectors not added to the densely packed array to random unit vectors added to the densely packed array, the densely packed array being full when the ratio exceeds a predetermined value.

10. The method of claim 6 wherein the culling step further comprises the steps of:
    selecting a culling cosine;
    choosing one of the unit vectors from the densely packed array; and deleting from the densely packed array all unit vectors within the culling cosine value of the chosen unit vector except for the chosen unit vector.

11. The method of claim 6 wherein, after the deleting step and when the densely packed array contains a unit vector not deleted or chosen, the culling step further comprises the steps of:

finding the unit vector of the densely packed array nearest the chosen unit vector;

saving the chosen unit vector as a trial member of the array of "J" unit vectors;

using the nearest unit vector as the chosen unit vector; and returning to the deleting step.

12. The method of claim 10 wherein, after the deleting step and when the densely packed array does not contain a unit vector not deleted or chosen, the culling step further comprises the step of determining if the number of trial member unit vectors is equal to the number of output processing nodes.

13. The method of claim 12 wherein, when the number of trial member unit vectors is not equal to the number of output processing nodes, the culling step further comprises:

restoring the densely packed array;

selecting a new culling cosine; and returning to the step of choosing one of the unit vectors from the densely packed array.

14. The method of claim 8 wherein the random unit vector is chosen from a group of unit vectors comprising all unit vectors in which all components of the unit vectors of the group have positive values.

15. The method of claim 14 wherein the densely packed array saving step further comprises the steps of:

obtaining an average direction value of the unit vectors of the densely packed array; and subtracting the average direction value from each unit vector of the densely packed array.

16. A method for determining weighting values of connections in a neural director having an input processing node layer with a first plurality "I" of input processing nodes and an output processing node layer having a second plurality "J" of output processing nodes, the connections being from each of the input processing nodes to each of the output processing nodes, the method comprising the steps of:

placing an array of "J" random direction unit vectors in a unit spherical space of "I" dimensions, the placing step further comprising the steps of:

randomly selecting one of the unit vectors;

determining from among neighboring unit vectors, a neighboring unit vector nearest the selected unit vector;

selecting an element of the selected unit vector;

randomly altering a value of the element;

determining if the altering results in movement of the selected unit vector in one of a direction away from the nearest neighboring unit vector and a direction not into a lesser distance towards at least one of the neighboring unit vectors not the nearest neighboring unit vector; and returning to the step of randomly selecting a unit vector with the altered unit vector normalized to a new unit vector when the altering results in movement; and assigning one element value of the array to each connection, such that the weighting value of a connection between an $i^{th}$ input processing node and a $j^{th}$ output processing node corresponds to an $i^{th}$ element value of a $j^{th}$ unit vector.

17. The method of claim 16 wherein, when the altering does not result in movement, the placing step further comprises returning to the step of randomly selecting a unit vector when the position of all unit vectors are not uniform within a predetermined accuracy.

* * * * *